(12) United States Patent
Ehlgen et al.

(10) Patent No.: US 8,818,093 B2
(45) Date of Patent: Aug. 26, 2014

(54) METHOD AND DEVICE FOR ANALYZING AN IMAGE OF AN IMAGE RECORDING DEVICE FOR A VEHICLE

(75) Inventors: Tobias Ehlgen, Ravensburg (DE); Ulrich Seger, Leonberg-Warmbronn (DE); Paul Ruhnau, Ditzingen (DE)

(73) Assignee: Robert Bosch GmbH, Stuttgart (DE)

( * ) Notice: Subject to any disclaimer, the term of this patent is extended or adjusted under 35 U.S.C. 154(b) by 81 days.

(21) Appl. No.: 13/579,885

(22) PCT Filed: Feb. 10, 2011

(86) PCT No.: PCT/EP2011/051934
§ 371 (c)(1),
(2), (4) Date: Oct. 19, 2012

(87) PCT Pub. No.: WO2011/104124
PCT Pub. Date: Sep. 1, 2011

(65) Prior Publication Data
US 2013/0039576 A1 Feb. 14, 2013

(30) Foreign Application Priority Data
Feb. 24, 2010 (DE) .................. 10 2010 002 312

(51) Int. Cl.
G06K 9/40 (2006.01)
G06K 9/46 (2006.01)

(52) U.S. Cl.
USPC ......................... 382/168; 382/195

(58) Field of Classification Search
USPC .......... 382/100, 104, 168, 195, 199, 270, 271
See application file for complete search history.

(56) References Cited

U.S. PATENT DOCUMENTS

| 6,310,546 B1 * | 10/2001 | Seta .............................. 340/507 |
| 6,353,392 B1 | 3/2002 | Schofield et al. |
| 6,987,534 B1 * | 1/2006 | Seta .............................. 348/229.1 |
| 7,423,752 B2 | 9/2008 | Leleve et al. |

FOREIGN PATENT DOCUMENTS

| DE | 103 03 046 | | 10/2004 |
| EP | 1 548 685 | | 6/2005 |
| JP | 2001 02 87 46 | | 1/2001 |
| JP | 2001028746 | * | 1/2001 |
| JP | 2007 245 970 | | 9/2007 |

OTHER PUBLICATIONS

International Search Report for PCT/EP2011/051934, dated Jul. 6, 2011.

* cited by examiner

*Primary Examiner* — Yon Couso
(74) *Attorney, Agent, or Firm* — Kenyon & Kenyon LLP

(57) ABSTRACT

In a method for analyzing an image of an image recording device for a vehicle, a piece of brightness information of the image is determined, taking an exposure characteristic of the image recording device into account, and a threshold value is set as a function of the piece of brightness information. An image structure of the image is furthermore determined, and a blindness value for the image is determined on the basis of the image structure, using the threshold value.

13 Claims, 4 Drawing Sheets

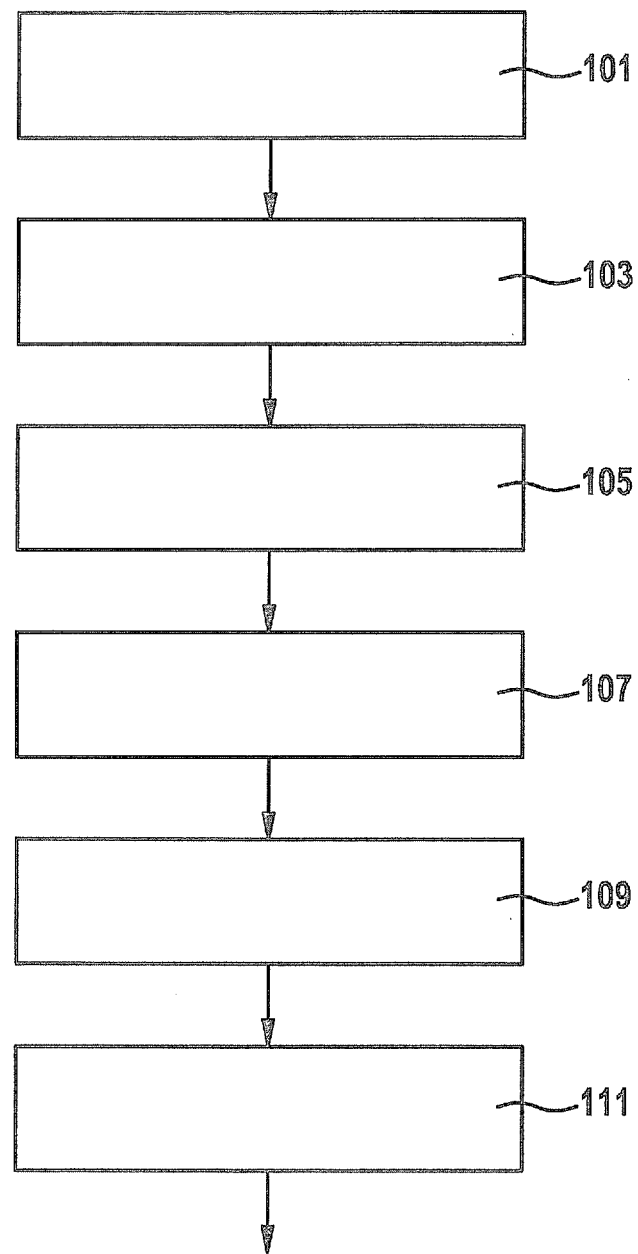

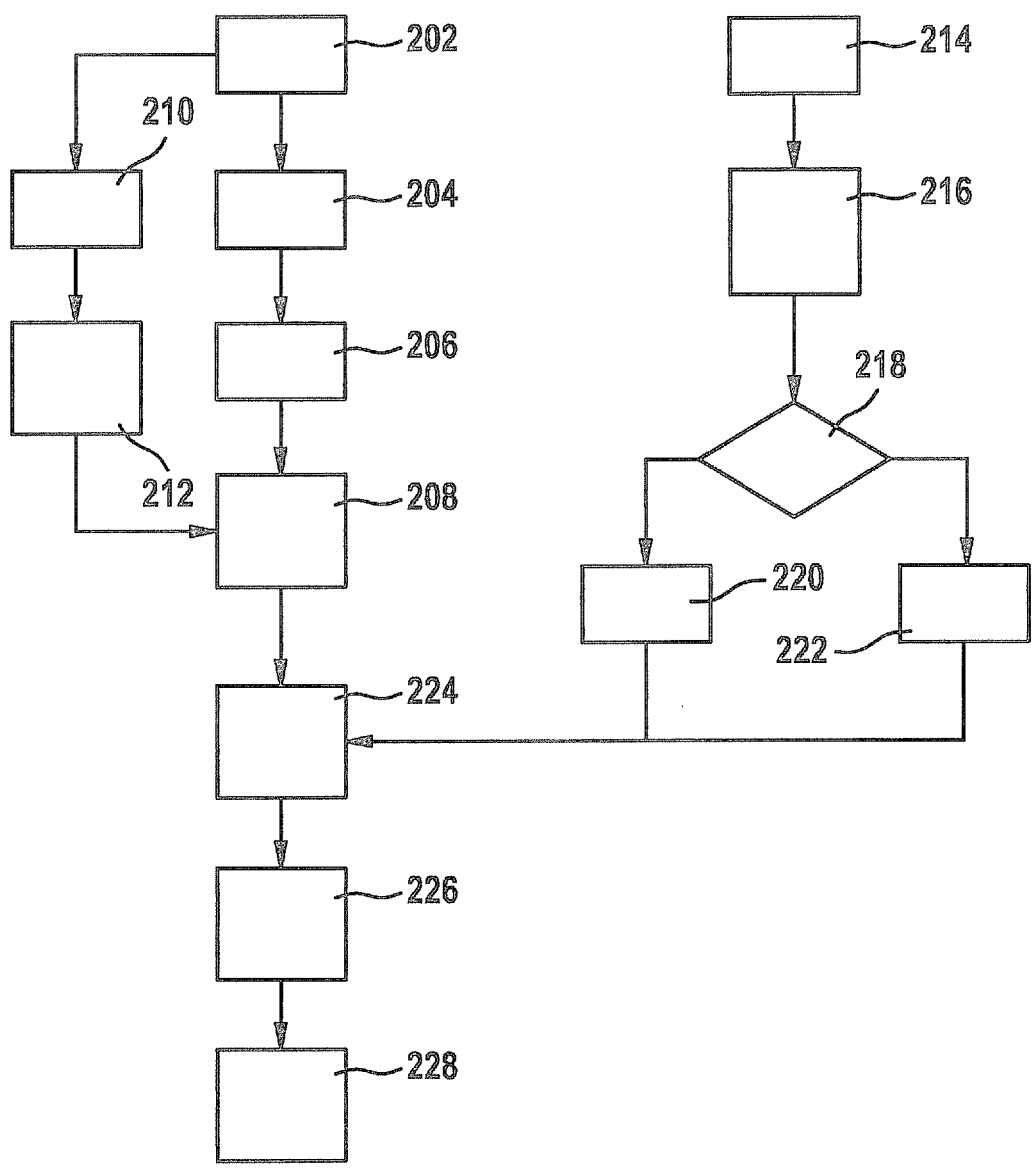

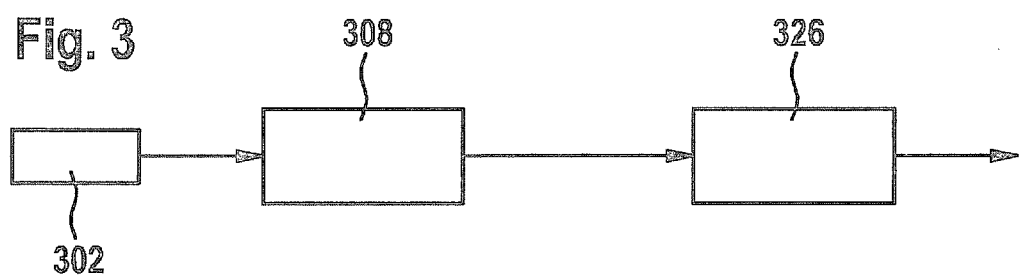
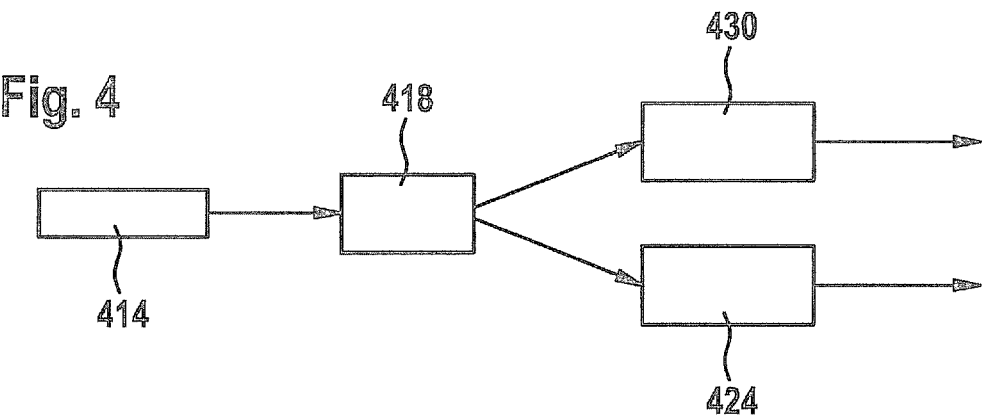

| | 202 | |
|---|---|---|
| 74<br>74<br>0<br>0<br>0 | 73<br>73<br>0<br>0<br>0 | 73<br>73<br>0<br>0<br>0 |
| 63<br>63<br>0<br>0<br>0 | 67<br>67<br>0<br>100<br>100 | 68<br>68<br>0<br>100<br>100 |
| 69<br>69<br>0<br>0<br>81 | 69<br>69<br>0<br>0<br>0 | 69<br>69<br>0<br>0<br>0 |

METHOD AND DEVICE FOR ANALYZING AN IMAGE OF AN IMAGE RECORDING DEVICE FOR A VEHICLE

BACKGROUND OF THE INVENTION

1. Field of the Invention

The present invention relates to a method for analyzing an image of an image recording device, to a corresponding control unit and to a corresponding computer program product.

2. Description of the Related Art

U.S. Pat. No. 7,423,752 B2 relates to fog detection algorithms which attempt to determine the visibility of a camera in fog. A detection of an object is based on the detection of edges.

BRIEF SUMMARY OF THE INVENTION

The object of the present invention is a blindness detection algorithm in which a blindness detection may be carried out as a function of a camera regulation. With the aid of the camera regulation, a statement may be made on the probability of a structure in the image, and the sensitivity of the blindness detection may be adapted accordingly. To make a statement concerning the blindness of the camera, the characteristic of the camera regulation may thus be taken into account. The sensitivity may be adapted more precisely by using a characteristic of the camera and not only the brightness. Due to the knowledge of the characteristic, and thus the relinearized histogram, the sensitivity of the blindness detection may be adapted much better to the present situation. Likewise, the generated histogram may be used not only for evaluating the sensitivity but also directly as another source of information, in addition to the structure in the image, for the purpose of making a statement concerning the blindness.

Another advantage of this specific embodiment is the knowledge of this relinearized histogram in certain areas of the image and not over the entire image. The blindness may thus be improved, particularly in scenes having great brightness differences in parts of the image.

The blindness detection may be adapted much better to the actual conditions by using the information from the camera regulation. This permits a more consistent statement concerning blindness.

The blindness detection algorithm may be based on structures, for example edges of an object. According to the present invention, a camera image may be divided. Special blindness signals may advantageously be generated for different functions, for example for operating a windshield heater when condensation forms. To improve the blindness detection, results of other measurement algorithms may be incorporated into the blindness evaluation.

A blindness probability may be calculated for different regions of an image, and blindness signals for different algorithms may be generated therefrom. The algorithms, in turn, may enter a secure state when blindness is detected. The blindness probability may be additionally offset against a visibility probability.

Visibility information may thus be used to support the blindness detection. In addition, a sensitivity of the blindness detection may be dependent on illumination. At night, for example, there is a lower probability of blindness occurring if few edges are found in the camera image. If the camera image is divided into blindness regions, blindness signals; in turn, may be calculated therefrom. For example, the regions in the upper area of the image are not relevant for the blindness detection of the lane detection system. According to the present invention, debouncing of the blindness signals may be dependent on the period of time in which the blindness is detected.

The present invention provides a method for analyzing an image of an image recording device for a vehicle, which includes the following steps: receiving an image via an image interface, the image representing an image provided by the image recording device; determining a brightness information of the image, based on the image, taking into account an exposure characteristic of the image recording device; setting a threshold value as a function of the brightness information; determining an image structure of the image; and determining a blindness value for the image based on the image structure, using the threshold value.

The image recording device may be a camera which is situated in or on a vehicle. The image recording device may be designed to continuously record and provide image information or images of the vehicle surroundings. The images may be used by different functions or consumers in the vehicle, for example a window heater or a lane assistant. If the image recording device is blind, the images provided to these functions contain no usable image information. If the blindness is not detected, this circumstance may result in a malfunction of the functions. The blindness may be caused, for example, by extreme dirtiness of the lens of the image recording device or by a defect therein. The blindness may affect the entire image area or only one or multiple image sections of the image provided by the image recording device. The blindness value or a value ascertained therefrom for a blindness probability defines the probability with which camera blindness has occurred. Based on the blindness value or the blindness probability, it is thus possible to determine whether image information affecting the image is faulty due to blindness and should therefore not be evaluated in the corresponding functions or should be evaluated only to a limited extent. The image structures may be edge contours along a brightness limit or luminescence limit within the image. An edge may thus define a brightness difference or a luminescence difference. Characteristics of the edge contours, for example the directions or lengths thereof, may be evaluated to determine the blindness values. To determine the blindness value, a special characteristic, for example an edge slope, may be compared with the threshold value, which may correspond to a blindness threshold value. A sensitivity of the blindness detection may be set via the threshold value. While the threshold value is set as a function of the brightness information, the blindness detection is dependent on the camera regulation. The image structures may also identify one or a plurality of objects which, for example, may be detected by an object detection system. In this case, a number of detected objects may be compared with the threshold value, which in this case may correspond to a visibility threshold value, for the purpose of determining the blindness value. The blindness detection may be carried out solely with the aid of a blindness detection, solely with the aid of a visibility check or with the aid of a combination of blindness detection and visibility check. In the event of a combination, the blindness detection and the visibility check may be carried out in separate devices.

The method according to the present invention may include a step of determining a relinearized histogram from the brightness information. Setting the threshold value may be carried out as a function of the relinearized histogram. In addition to setting the threshold value, the histogram may also be used, in addition to the image structure, as an additional source of information to make a statement concerning the blindness.

The method according to the present invention may furthermore include a step of ascertaining a brightness change based on a time progression of the brightness information. The determination of the blindness probability may be carried out for each of the regions, furthermore on the basis of the brightness change. The brightness change represents an additional way to detect the blindness or to protect against it. The histogram may be evaluated in the process. If little movement occurs therein, this may be evaluated as an indication of blindness.

According to one specific embodiment, the image structures may each represent one edge slope per region. The edge slope may be ascertained with the aid of known methods and provides a good measure of the structuredness of an image area.

According to one specific embodiment, the image structures may represent at least one object which is shown in the image. For example, the image structures may characterize outlines or surface contours of the object, which may be evaluated for image recognition purposes.

The method according to the present invention may also include a step of receiving a piece of information concerning objects which have been detected on the basis of images provided by the image recording device. In a step of determining a number of objects, this number may be determined for the image on the basis of the information about the objects, the number of objects including a number of detected objects per image. In a determination step, a visibility value may be determined for the image on the basis of the number of objects, using a visibility threshold value. The determination of a blindness probability for the image may be carried out on the basis of the blindness value and the visibility value. An additional protection against blindness may be provided by evaluating the number of objects in the image. If no objects are counted, this may be an indication of camera blindness. The objects included for determining the visibility value may be, for example, detected lanes or other vehicles. The visibility value or a value ascertained therefrom for a blindness probability defines the probability with which a visibility or blindness of the camera has occurred. The object detection may be carried out by separate object detection devices. The object detection may be based on the instantaneous image of the camera or based on chronologically preceding images. The number of objects detected within a predetermined time interval may be counted. The value of the number of objects may be updated continuously in this way.

According to one specific embodiment, the visibility threshold value may be set as a function of the brightness information. In this way, a sensitivity of the image recording set via the camera regulation may be taken into account during the visibility check.

An existing visibility value for the image may be changed by a predetermined value as a function of a comparison between the number of objects in the image and the visibility threshold value. For example, the existing visibility value may be reduced if no objects or only fewer objects are counted than indicated by the visibility threshold value.

According to one specific embodiment, the method according to the present invention may include a step of dividing the image into individual regions, it being possible to determine a blindness value and/or a visibility value for each of the regions. To determine a blindness value for each region, a determination of image structures of the image for each region, and a determination of a blindness value for each of the regions, based on the image structures of the particular regions, using the blindness threshold value, may be carried out after the image has been divided. The total image may thus be divided into regions, each region including a certain area of the total image. All regions together may yield the total image. The individual regions of the image cannot overlap. This makes it unnecessary to evaluate image data twice. Alternatively, it is possible for image areas in individual regions to overlap. A blindness value is determined for each region. Furthermore, a blindness probability may be determined for this region, based on the particular blindness value. The blindness value or the value ascertained therefrom for the blindness probability defines the probability that camera blindness is present in the area covered by the particular region. Based on the blindness probability, it is thus possible to determine whether a piece of image information affecting the image is faulty due to blindness and should therefore not be evaluated in the corresponding function or should be evaluated only to a limited extent. A visibility value may be determined in a corresponding way for each of the regions. An object which extends over multiple regions may be counted for each of the regions. If many objects are counted in a region, this indicates that the camera is not blind, at least with regard to this region.

The method according to the present invention may furthermore include a step of determining a first piece of blindness information, based on blindness values of a first group of regions, and a second piece of blindness information, based on blindness values in a second group of regions. The pieces of blindness information may also be provided as blindness signals. The pieces of blindness information may each indicate whether or not blindness of the image recording device is assumed with regard to the particular group of regions. The first piece of blindness information may be provided to a function which is based on image information from the first group of regions in the image. Correspondingly, the second piece of blindness information may be provided to a function which is based on image information from the second group of regions in the image. Individual regions may be included in multiple groups.

The method according to the present invention may include a step of providing the first piece of blindness information to a first image evaluation device and the second piece of blindness information to a second image evaluation device. The first image evaluation device may be designed to evaluate image information of the image included in the first group of regions, and the second image evaluation device may be designed to evaluate image information of the image included in the second group of regions. The pieces of blindness information may each also be provided as signals. The image evaluation devices may represent functions or consumers.

The present invention furthermore provides a device for analyzing an image of an image recording device which is designed to carry out or implement the steps of the method according to the present invention. The object of the present invention may also be achieved quickly and efficiently with the aid of this embodiment variant of the present invention in the form of a device.

In the present case, a device may be understood to be an electrical unit which processes sensor signals and outputs control signals as a function thereof. The device may have an interface which may be designed as hardware and/or software.

In a hardware design, the interfaces may be, for example, part of a so-called system ASIC, which includes a wide range of functions of the device. However, it is also possible for the interfaces to be separate, integrated circuits or to be made at least partially of discrete components. In a software design, the interfaces may be software modules which are provided, for example, on a microcontroller, along with other software modules.

A computer program product having program code is also advantageous, which is stored on a machine-readable carrier such as a semiconductor memory, a hard disk memory or an optical memory, and is used to carry out the method according to one of the specific embodiments described above when the program is executed on a device.

BRIEF DESCRIPTION OF THE DRAWINGS

FIG. 1 shows a flow chart of one exemplary embodiment of the present invention.

FIG. 2 shows a flow chart of another exemplary embodiment of the present invention.

FIG. 3 shows a flow chart of a segment of a method according to the present invention, according to one exemplary embodiment of the present invention.

FIG. 4 shows a flow chart of another segment of a method according to the present invention, according to one exemplary embodiment of the present invention.

DETAILED DESCRIPTION OF THE INVENTION

Figures 5, 6:
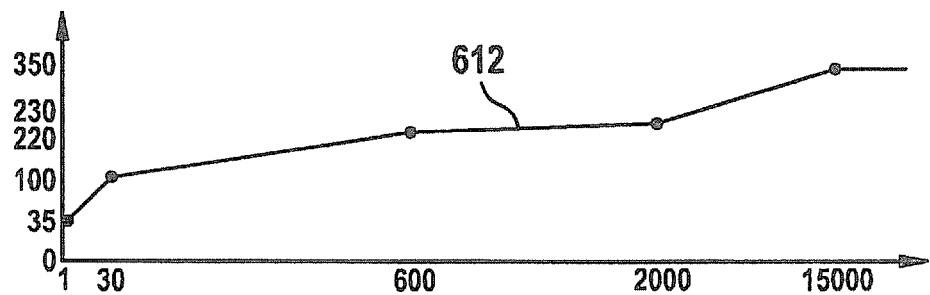
FIG. 5 shows a representation of a camera image according to one exemplary embodiment of the present invention.
FIG. 6 shows a brightness characteristic according to one exemplary embodiment of the present invention.

In the following description of preferred exemplary embodiments of the present invention, identical or similar reference numerals are used for the elements which are illustrated in the different figures and have similar functions, and these elements will not be described repeatedly.

FIG. 1 shows a flow chart of a method for analyzing an image of an image recording device, according to one exemplary embodiment of the present invention. An image is received in a step 101. The image may be received directly from the image recording device, for example a camera, in the form of a raw image, or it may be received from a preprocessing device in the form of a preprocessed image. The image may have image information, for example in the form of pixels which reproduce a viewing area of the image recording device.

A piece of brightness information may be determined in a step 103. This may be done by taking an exposure characteristic of the image recording device into account. A piece of information concerning the exposure characteristic may be provided by the image recording device or be read out from a memory device. A blindness threshold value may be set as a function of the brightness information in a step 105. Furthermore, an image structure of the image may be determined in a step 107, and a blindness value for the image may be determined in a step 109. The blindness value may be determined on the basis of the image structure, using the blindness threshold value. A blindness probability for the image may be determined from the blindness value in a step 111.

According to another exemplary embodiment, not only a total blindness value or a total blindness probability for the total image may be determined but also individual blindness values or individual blindness probabilities for individual regions of the image.

For this purpose, the image may be divided into a plurality of regions. For example, three rows and three columns may be created, so that the image is divided into nine regions. Alternatively, the image may be divided in a different way, and more or fewer than nine regions may be created. The regions may each cover different image areas. Alternatively, the regions may partially overlap. The image areas may be selected in such a way that the regions used by the algorithms are covered.

Image structures which are located within the corresponding regions may be determined for each region. The image structures may represent edge contours. The image structures may be determined on the basis of known methods, for example methods for determining edges in an image. The image structures in each region are used to determine a blindness value for each of the regions. Thus, a separate blindness value is determined for each region on the basis of the image structures in the particular image. For this purpose, the image structures or a variable derived therefrom may be compared with a blindness threshold value. According to the present invention, the average edge slope may be used as the structure. The blindness value may be set to a corresponding value as a function of a comparison result. For example, the blindness value may have a first value when the blindness threshold value is exceeded and a second value when the blindness value drops below the blindness threshold value. The first value may provide an indication of existing blindness for the corresponding region, and the second value may provide an indication of an existing non-blindness for the corresponding region, or vice versa.

The blindness threshold value may be permanently predefined, or it may be variable. If the blindness threshold value is variable, a sensitivity of the blindness detection may be set via the blindness threshold value. For example, the blindness threshold value may be set as a function of a brightness of the image or a brightness of the region of the image. If the brightness threshold value is set as a function of a brightness of one region of the image, the region may be a predetermined region or the region for which the blindness value is subsequently determined on the basis of the blindness threshold value. A blindness threshold value assigned to the brightness may be selected as a function of the brightness.

The brightness of the image depends on a regulation of the image recording device. The regulation may represent, for example, an exposure characteristic. The brightness of the image is dependent on the exposure characteristic. Thus, the image may have a great brightness even though the recorded surroundings are dark. The knowledge of the exposure characteristic or a regulation used in recording the image makes it possible to infer the actual brightness, for example the surroundings displayed by the image, from the brightness of the image. A blindness threshold value assigned to the actual brightness may thus be selected as a function of the actual brightness. For this purpose, no additional sensors are needed to ascertain the brightness in the surroundings. Instead, the actual brightness may be determined on the basis of the brightness of the image or a region of the image and the camera regulation. A piece of information concerning the camera regulation may be provided to the method according to the present invention via an interface.

A blindness probability may be determined for each region. The blindness probability of a region is determined on the basis of the blindness value assigned to the region. The blindness probability of a region indicates the probability of the image recording device being blind in an area covered by the region.

Blindness probabilities of individual regions may be linked with each other. Different pieces of blindness information, each of which may relate to different groupings of regions, may thus be provided. For example, a first piece of blindness information may be determined for a first group of regions, and a second piece of blindness information may be determined for a second group of regions. The particular piece of blindness information is based on the blindness probabilities of the regions of the particular groups. Additional pieces of blindness information may be provided for additional groups. A piece of blindness information which is assigned to only one region may also be provided. The piece of blindness information, or a signal based thereon, may be provided to a function which evaluates or further processes an area of the image which is covered by the particular group of regions. For example, the signal based on a piece of blindness information may include a warning of a detected blindness when an average blindness probability which is generated from the blindness probabilities of the group of regions exceeds or drops below a limiting value. Alternatively, the signal based on the piece of blindness information may include a warning of the detected blindness when the blindness probability of one or multiple regions exceeds or drops below a limiting value.

To be able to more precisely determine the blindness probabilities, a separate visibility value may be additionally determined for each region. A variable of the visibility value depends in each case on whether objects are detected in the corresponding region and, if objects are detected, how many objects are detected. The detection of the objects may be part of the method according to the present invention, or it may be carried out separately therefrom. If the object detection is carried out separately, the method according to the present invention may be provided with corresponding object information from which the number of objects per region may be ascertained. The blindness values and the visibility values may be determined in parallel. An assigned visibility value and an assigned blindness value may thus be determined for each region, and an assigned blindness probability may be determined on the basis thereof. In this case, the blindness probability for a region is determined by combining or logically linking the corresponding blindness value and the corresponding visibility value with each other.

The blindness probabilities may each be determined for all regions or for only certain regions. The method according to the present invention may be repeated continuously or carried out in response to a query.

FIG. 2 shows a flow chart of a method for analyzing an image of an image recording device, according to another exemplary embodiment of the present invention.

The figure shows a sensor image 202, which may be provided, for example, by an image recording device. A division of image 202 into nine regions is carried out in a step 204. The nine regions form a 3×3 matrix. A determination 206 of the average edge slope per region follows. The blindness per region is determined in a step 208 as a function of a threshold value.

The probability of blindness is expressed in percent and it is dependent on the difference between the current average edge slope and the threshold value. In this case, 100% means that few edges exist, and blindness has therefore occurred. 0% means that the average edge slope is above the threshold value.

Parallel to steps 202, 204, the brightness in image 202 or in a region may be determined in a step 210. A threshold value may be determined in a step 210. For this purpose, a characteristic may represent the dependency between the threshold value and the brightness. The threshold value may be used to determine the blindness in step 208. Additionally or alternatively, a regulation of the image recording device, for example an exposure characteristic, may be taken into account in step 210 to determine the threshold value.

Again parallel to steps 202, 204, 208, results of measuring algorithms may be received in a step 214. The measuring algorithms may be designed to detect, for example lanes, objects or traffic signs, collectively referred to as objects, on the basis of sensor image 202 or on chronologically preceding images in sensor image 202. A counting of the number of objects detected in one of the nine regions during a time interval may be carried out in a step 216. A threshold value comparison 218 may subsequently be carried out. If there are more detected objects in the region than specified by a threshold value, a visibility probability for this region may be set to 100% in a step 220. However, if there are no more detected objects in the region than specified by a threshold value, a visibility probability for this region may be reduced in a step 222. For example, a current visibility probability for this region may be provided from an existing visibility probability for this region by subtracting the value 1 from the existing visibility probability. In this case, the following applies: visibility probability=visibility probability−1.

Steps 202, 204, 206, 208, 210, 212 are used for detecting blindness. Steps 214, 216, 218, 220, 222 are used for detecting visibility.

The blindness values determined in step 208 and the visibility values determined in steps 220, 222 are combined in a step 224, and a blindness probability is determined. For example, a subtraction may be carried out for this purpose. A separate blindness probability may be determined for each region. According to this exemplary embodiment, the following applies: Blindness probability=blindness−visibility. The blindness probability may never become negative. A visibility value may correspond to the visibility probability. A blindness signal is determined in a step 226 for each function to which blindness information is supplied by the method according to the present invention. A blindness signal which is determined for a certain function may be determined from blindness probabilities of different regions. A transmission of the blindness signal(s) is carried out in a step 228.

Individual method steps for the blindness detection and visibility check according to the present invention are described in greater detail below according to additional exemplary embodiments.

FIG. 3 shows a block diagram of a blindness detection system according to one exemplary embodiment of the present invention. The figure shows an imager or image converter 302, which is designed to provide a raw image to a device 308 for blindness detection. The device 308 for blindness detection is designed to determine a blindness matrix on the basis of the raw image and to provide it to a device 326 for signal processing. Device 326 signal processing is designed to provide signals to consumers of the blindness detection system on the basis of the blindness matrix.

With regard to the exemplary embodiment illustrated in FIG. 2, imager 302 may be designed to provide sensor image 202. For example, method steps 204, 206, 208, 210, 212, 224 may be implemented in device 308, and method steps 226, 228 may be implemented in device 326.

For the purpose of blindness detection, each image, for example the image provided by imager 302, may be divided, for example, into nine regions of equal size. A blindness probability may be calculated, for example, in device 308, for each region. The blindness probability may be based on the structures found in the image. The structures may be edges. The signals for the individual blindness consumers may be determined in a further component, which may correspond to device 326. Blindness consumers may include, for example, a VDD, ACC, WHE or RSR. VDD refers to a function for vehicle detection in the dark. It is needed for controlling the headlights. If blindness has occurred, no vehicles are detected, and the vehicle is driven with high beams permanently turned on. ACC refers to an adaptive cruise control system. The vehicle thus starts automatically and must therefore monitor the area ahead of the vehicle; if blindness has occurred, a pedestrian, for example, is not detected. WHE refers to the window heater. If blindness is detected, the heater is started to remove the blindness, if necessary. RSR refers to road sign recognition.

FIG. 4 shows a block diagram of a visibility check and blindness detection according to one exemplary embodiment of the present invention. The figure shows algorithms 414, which are designed to provide results to a device 418 for checking visibility. Device 418 for checking visibility is designed to determine a visibility matrix on the basis of the results and to provide the visibility matrix to a device 424 for blindness detection and to a device 430 for signal processing. Device 430 for signal processing is designed to provide a "visibility_nio" signal on the basis of the visibility matrix. Device 424 for blindness detection is designed to provide blindness signals on the basis of the visibility matrix. The visibility matrix may have a visibility probability value for each region.

With regard to the exemplary embodiment illustrated in FIG. 2, algorithm 414 may be designed to provide results 214. Device 418 may be designed to implement method steps 216, 218, 220, 222. Device 424 may be designed to implement method step 224.

As in the blindness detection system, the image may be divided into nine regions of equal size for the visibility check. If more than a certain number of objects, for example lanes, VDD or MOV objects, is detected within a time interval of, for example, one second, the corresponding matrix element is set to 100%. If no more objects are detected in the subsequent time intervals, the visibility value decreases by a certain percentage, for example by 1%, per time interval. MOV means monocular object verification and should actually be referred to as MOD (object detection), since objects such as cars or motorcycles are detected with the aid of the camera during the day.

The visibility_nio signal may be determined on the basis of the visibility check. In particular, the visibility_nio signal may be determined on the basis of the visibility matrix. If a sufficient number of objects, for example LDA, VDD and MOV objects, have been detected in the image, the visibility_nio signal is set from 1 to 0 according to this exemplary embodiment. The signal is set at the beginning of a terminal 15 cycle. Once visibility has been detected, the visibility_nio signal is transmitted and not recalculated.

A visibility check as well as a blindness detection may thus be carried out on the basis of the results provided by algorithms 414. A detected visibility results in correction of the blindness. According to this exemplary embodiment, however, this applies only to the visibility check on the DPC, i.e., the results of LDA and VDD are used. The visibility percentage is subtracted from the blindness probability. The individual signals of the blindness detection may be calculated on the basis of this new blindness matrix, the so-called corrected blindness matrix. DPC means dual-purpose camera. The cameras have only two main functions, to detect lanes and vehicles in the dark.

FIG. 5 shows a sensor image 202 according to one exemplary embodiment of the present invention. The image is divided into three columns and three rows, resulting in nine regions. Values applying to blindness and visibility are indicated for each region, which may be determined for illustrated image 202 in the method according to the present invention.

The following values have been determined for the regions on the top row, from left to right:

| Blindness indicator: | 74 | 73 | 73 |
|---|---|---|---|
| Corrected blindness: | 74 | 73 | 73 |
| DPC visibility: | 0 | 0 | 0 |
| IPCU visibility: | 0 | 0 | 0 |
| Combined visibility | 0 | 0 | 0 |

The following values have been determined for the regions in the middle row, from left to right:

| Blindness indicator: | 63 | 67 | 68 |
|---|---|---|---|
| Corrected blindness: | 63 | 67 | 68 |
| DPC visibility: | 0 | 0 | 0 |
| IPCU visibility: | 0 | 100 | 100 |
| Combined visibility | 0 | 100 | 100 |

The following values have been determined for the regions on the bottom row, from left to right:

| Blindness indicator: | 69 | 69 | 69 |
|---|---|---|---|
| Corrected blindness: | 69 | 69 | 69 |
| DPC visibility: | 0 | 0 | 0 |
| IPCU visibility: | 0 | 0 | 0 |
| Combined visibility | 81 | 0 | 0 |

If the visibility_nio=0 signal has been set once, the visibility detection on the IPCU is no longer carried out. IPCU means image processing control unit. Since the camera may provide only two functions, the other functions are calculated on the IPCU.

Image 202 shows a snow-covered windshield of a vehicle. Image 202 has a higher brightness in the regions of the top row than in the regions of the bottom row. No clear structures and no objects are apparent in image 202.

Blindness signals may be determined and provided with the aid of the method according to the present invention. The blindness signals may be determined in method step 226 with regard to FIG. 2.

According to this exemplary embodiment, the areas in the image in which blindness is to be detected are selected for each consumer of the blindness detection system. If the average blindness probability in these regions is higher than a threshold value for a predetermined period of time, for example 45 seconds, the appropriate blindness signal is transmitted.

For the window heater consumer, the entire image is used for detection. All regions or partial images are therefore selected. With regard to ACC blindness, the middle and bottom portions of the image are used, for example the partial images on the middle and bottom rows shown in FIG. 5. With regard to the VDD blindness, the middle area of the image is used. With regard to the RSR blindness, the middle and top areas are used. With regard to the error memory entry blindness, a debounce time of 30 minutes and the entire image are used.

FIG. 6 shows a brightness characteristic 612 according to one exemplary embodiment of the present invention. Brightness characteristic 612 is plotted on a diagram, a light intensity cbl (camera-based light sensor) is plotted on the abscissa, and a mean value of a threshold value, which represents a sensitivity of the blindness detection, is plotted on the ordinate. Brightness characteristic 612 may be used in method step 212 with regard to FIG. 2. A threshold value, which may be used in method step 208, may be read out from brightness characteristic 612 as a function of the brightness of the image.

The threshold value has a value of 35 for a light intensity of 1 cbl, a value of 100 for a light intensity of 30 cbl, a value of 220 for a light intensity of 600 cbl, a value of 230 for a light intensity of 2,000 cbl and a value of 350 for a light intensity of 15,000 cbl. A lower threshold value may thus be selected for a dark image and a higher threshold value for a bright image. Accordingly, a sensitivity with regard to the identification of the blindness is lower in a dark image than in an extremely bright image. In-between, the sensitivity increases only slightly as the brightness increases.

Brightness characteristic 612 defines a sensitivity of the blindness detection. Very low-structure scenes, which are similar to blindness scenes, occur particularly at night. A brightness-dependent sensitivity of the blindness detection therefore results, as shown by characteristic 612.

In addition or as an alternative to brightness characteristic 612, a camera regulation may be taken into account to set the sensitivity of the blindness detection. The camera regulation may be taken into account with the aid of an exposure characteristic.

The mean value and the variance of the relinearized histogram may thus be added to the blindness detection to control the sensitivity of the blindness detection.

The characteristic of the camera regulation may be used directly to make a statement concerning the structures in the image.

If a relinearized histogram is available for multiple areas in the image, a better statement may be made concerning the blindness if the image includes very bright and very dark areas.

Brightnesses and contrasts in the world are critical for a blindness detection, while a camera regulation is aimed at always generating an optimally exposed image having as much contrast as possible. Two scenarios are conceivable in principle.

According to the first scenario, the world is very low-contrast, e.g., due to fog, but the camera regulation generates a high-contrast image by emphasizing the extremely low contrasts.

According to the second scenario, the world is very high-contrast, e.g., due to the setting sun or cast shadows. For the camera regulation to represent the full scope of contrast, i.e., if there is no saturation in the image, contrasts are compressed both in the dark area and in the bright area. This results in disappearing edges, e.g., in the case of rows of trees at the roadside, which, in turn, may result in a blindness detection.

In both cases, it is advantageous that the blindness detection takes into account the instantaneously set characteristic of the camera regulation and it is thus calculated not on the basis of gray values but on the basis of brightness values.

The exemplary embodiments described and illustrated in the figures were selected only by way of example. Different exemplary embodiments may be combined with each other in their entirety or with regard to individual features. In addition, one exemplary embodiment may be supplemented by features of another exemplary embodiment. Furthermore, method steps according to the present invention may be repeated as well as carried out in a different order than the one described.

What is claimed is:

1. A method for analyzing image data of an image recorded by an image recording device for a vehicle, comprising:
   receiving, with a processor, the image data of the image via an image interface from the image recording device;
   determining, by the processor, a brightness information of the image on the basis of the image data, taking an exposure characteristic of the image recording device into account;
   setting, by the processor, a threshold value as a function of the brightness information;
   determining, by the processor, an image structure of at least one region of the image; and
   determining, by the processor, a blindness value for the image by comparing the image structure and the threshold value.

2. The method as recited in claim 1, further comprising:
   determining a relinearized histogram from the brightness information, wherein the setting of the threshold value is carried out as a function of the relinearized histogram.

3. The method as recited in claim 1, further comprising:
   ascertaining a brightness change on the basis of a time progression of the brightness information, wherein the determination of the blindness value is carried out additionally on the basis of the brightness change.

4. The method as recited in claim 3, wherein multiple image structures are determined for multiple regions of the image, and wherein the image structures each represent one edge slope per region.

5. The method as recited in claim 3, wherein multiple image structures are determined for multiple regions of the image, and wherein each image structure represents an object shown in the image.

6. The method as recited in claim 3, further comprising:
   receiving information concerning objects which are detected on the basis of the image data provided by the image recording device;
   determining a number of objects contained in the image on the basis of the information concerning the objects; and
   determining a visibility value for the image on the basis of the number of objects, using a visibility threshold value.

7. The method as recited in claim 6, wherein the visibility threshold value is set as a function of the brightness information.

8. The method as recited in claim 6, further comprising:
   determining a blindness probability for the image on the basis of the blindness value and the visibility value.

9. The method as recited in claim 6, wherein an existing visibility value for the image is changed by a predetermined value as a function of a comparison between the number of objects in the image and the visibility threshold value.

10. The method as recited in claim 6, further comprising:
    dividing the image into multiple regions, wherein a blindness value and a visibility value is determined for each of the regions.

11. The method as recited in claim 10, wherein a first item of blindness information is determined on the basis of blindness values of a first group of regions, and a second item of blindness information is determined on the basis of blindness values in a second group of regions.

12. A device for analyzing image data of an image recorded by an image recording device for a vehicle, comprising:
    an interface receiving the image data of the image;
    means for determining a brightness information of the image on the basis of the image data, taking an exposure characteristic of the image recording device into account;
    means for setting a threshold value as a function of the brightness information;
    means for determining an image structure of at least one region of the image; and means for determining a blindness value for the image by comparing the image structure and the threshold value.

13. A non-transitory computer-readable data storage medium storing a computer program having program codes which, when executed on a computer, performs a method for analyzing image data of an image recorded by an image recording device for a vehicle, the method comprising:
- receiving the image data of the image via an image interface from the image recording device;
- determining a brightness information of the image on the basis of the image data, taking an exposure characteristic of the image recording device into account;
- setting a threshold value as a function of the brightness information;
- determining an image structure of at least one region of the image; and
- determining a blindness value for the image by comparing the image structure and the threshold value.

* * * * *